April 22, 1969  T. F. SCHWARTZ  3,439,599
AERIAL CAMERA

Filed Aug. 5, 1966  Sheet _1_ of 2

INVENTOR.
THEODORE F. SCHWARTZ
BY
Wm. H. Dean

INVENTOR.
THEODORE F. SCHWARTZ
BY
Wm. H. Dean

United States Patent Office 3,439,599
Patented Apr. 22, 1969

3,439,599
AERIAL CAMERA
Theodore F. Schwartz, 11660 St. Andrews Way,
Scottsdale, Ariz. 85252
Filed Aug. 5, 1966, Ser. No. 570,494
Int. Cl. G03b 29/00
U.S. Cl. 95—12.5                                    7 Claims

ABSTRACT OF THE DISCLOSURE

An aerial camera having a rotary shutter which alleviates the inertia effects of operation. The rotary shutter is provided with a disc having an opening rotatable about and across the area of the camera lens by a motor. A solenoid operated latch mechanism allows one revolution of the disc for each film exposure operation of the camera.

---

This invention relates to an aerial camera, and more particularly, to an aerial camera having novel shutter and shutter operating means especially adapted to alleviate inertia effects of shutter operations and to thereby prevent the vibration of the camera during exposure of film.

Heretofore, aerial cameras have employed very complex shutter operating mechanism and very substantial shutter structure, all of which has created internal vibrational problems of the camera during exposure of film.

Additionally, most conventional aerial cameras utilize an iris-type shutter which requires very substantial mechanism requiring substantial operating forces and a great number of very precisely machined parts.

Accordingly, it is an object of the present invention to provide a novel aerial camera having a very simple shutter mechanism which operates with a minimum of mechanism and which causes a minimum amount of camera vibration during the exposure of film.

Another object of the invention is to provide an aerial camera having novel shutter and shutter operating mechanism which, during the exposure of film, creates a minimum of camera movement relative to the target and, consequently, provides for very sharp exposures of film.

Another object of the invention is to provide a novel shutter mechanism employing a shutter disc having an aperture adapted to rotate past the camera lens and whereby each time the shutter is operated, the disc makes a complete rotation so that the aperture passes the lens from one side to the opposite side and thereby making one complete sweep only to provide for uniform exposure over the cross-sectional area of the lens.

Another object of the invention is to provide a novel shutter mechanism, wherein a rotating disc is provided with an aperture to sweep the area of a lens; said disc being rotated by a motor and the motor being stopped by a latch mechanism once during each revolution; the motor and the latch mechanism being energized concurrently and the inertia effects of operating the motor and the latch mechanism being opposed and generally disposed concentrically about the rotational axis of the shutter disc to thereby minimize any movement effects of the camera, as created by the inertia effects of operating the shutter disc.

Another object of the invention is to provide a novel shutter mechanism employing a motor operated cam having a recess therein and a shutter disc connected with the cam and having an aperture adapted to sweep the area of a lens; the cam being provided with a stop member and a cam portion cooperable with a solenoid operated latch and detent spring to thereby permit the disc to rotate precisely one revolution for each shutter operation and to permit rotation of the disc in the same direction during each cycle of operation to thereby provide very simple and reliable operation of the shutter and to permit it to move in one direction only to carry the aperture of the disc only once across the area of the lens.

Further objects and advantages of the invention may be apparent from the following specification, appended claims and accompanying drawings, in which:

Figure 1:
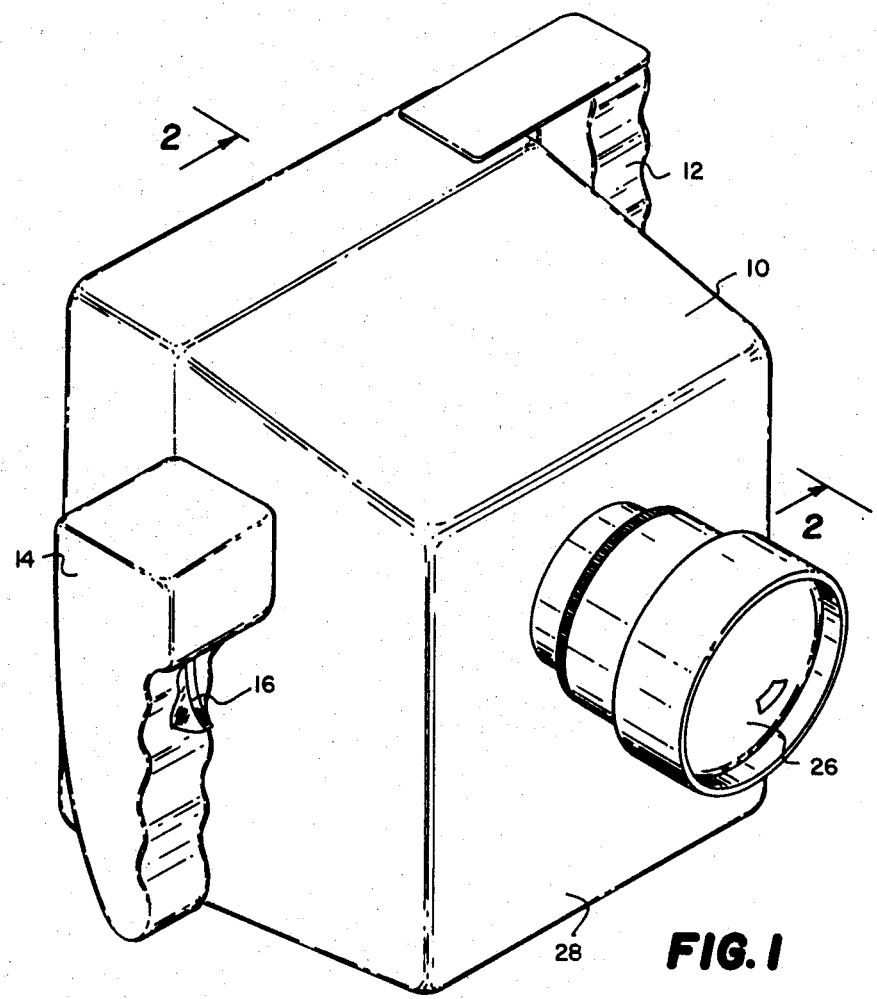
FIG. 1 is a perspective view of an aerial camera in accordance with the present invention.
Figure 4:
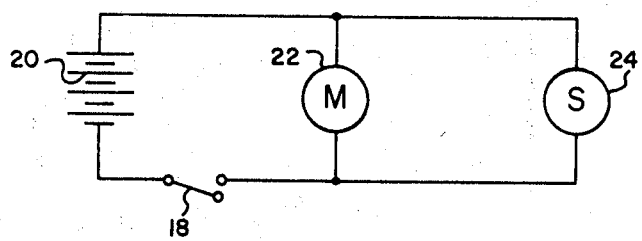
FIG. 4 is a diagrammatic view of the electrical wiring in connection with the mechanism of the camera.

As shown in FIG. 1 of the drawings, the camera is provided with a housing 10 and handles 12 and 14. Adjacent the handle 14 is a pivoted trigger 16 adapted to operate an electrical switch 18, as shown in FIG. 4 of the drawings. This switch 18 being coupled in circuit with a battery 20 or any other suitable power supply and also in circuit with a motor 22 and a solenoid 24, as will be hereinafter described in detail.

Figure 2:
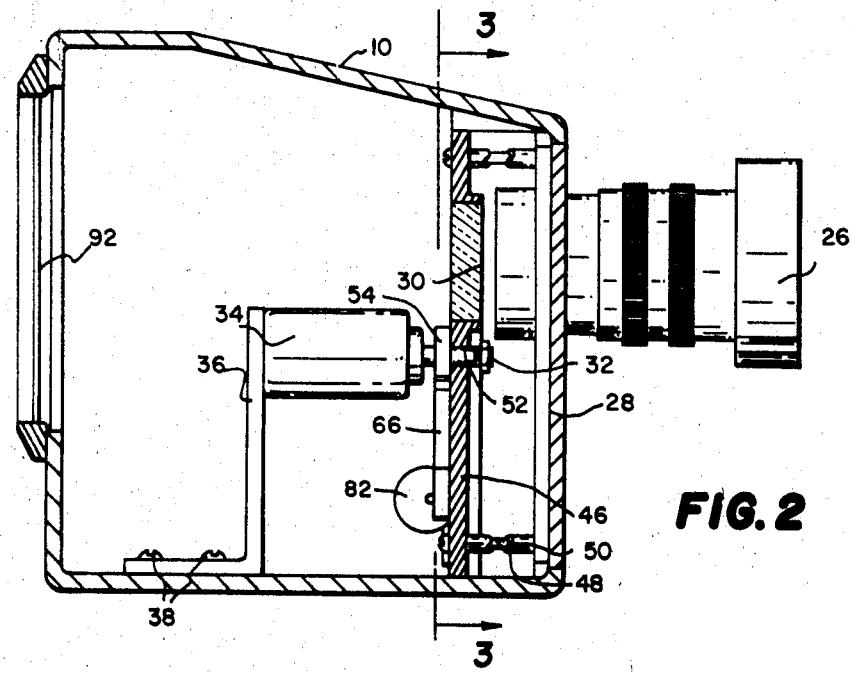
FIG. 2 is a vertical sectional view thereof, taken from the line 2—2 of FIG. 1, and showing parts and portions of the invention in elevation.

At the front of the housing 10 is a conventional lens assembly 26, all as shown best in FIGS. 1 and 2 of the drawings.

Figure 3:
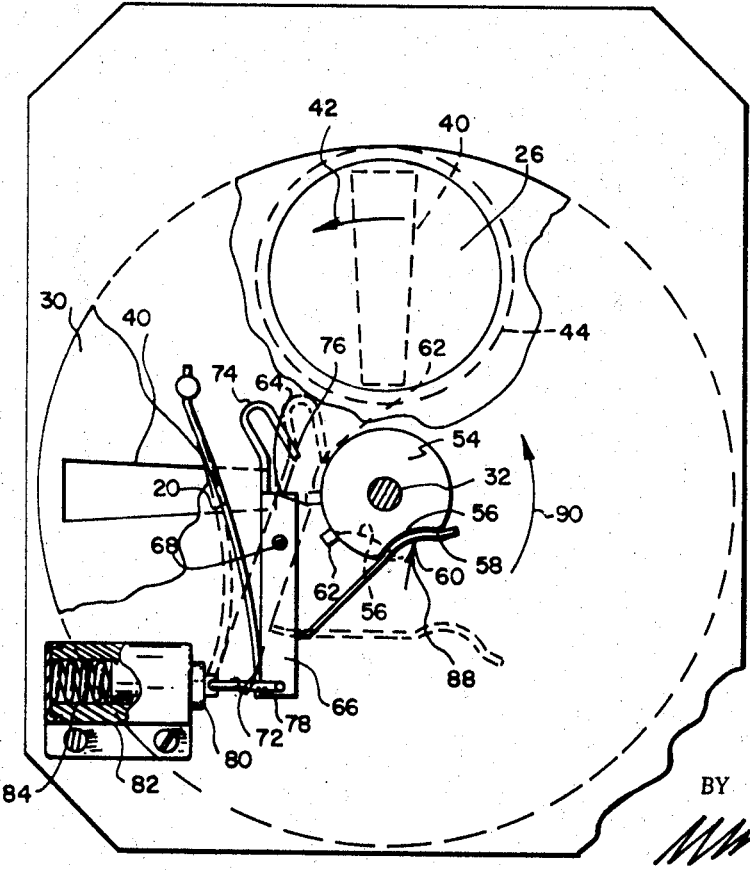
FIG. 3 is an enlarged fragmentary sectional view taken from the line 3—3 of FIG. 2, omitting the housing of the camera and showing parts broken away and in section to amplify the illustration, and further showing portions in various positions by broken lines.

As shown in FIG. 2 of the drawings, the housing 10 is provided with a front plate 28 which supports the lens 26. The lens 26 thus communicates with the interior of the camera inside the plate 28 and faces a rotary shutter plate 30 mounted on a rotating shaft 32 of a motor 34 carried by a bracket 36 secured to the bottom of the housing 10 by bolts 38. The shutter plate 30 is provided with an aperture 40, as shown in FIG. 3 of the drawings, which is adapted to move, as indicated by an arrow 42, across the area of the lens 26 generally in the position, as indicated by broken lines 44. This is permitted by reason of the fact that the disc 30 is secured to the shaft 32 of the motor 34 and may be rotated about the axis thereof.

Secured to the plate 28 is a shutter mounting plate 46, this plate 46 is secured by bolts 48 and sleeves 50 to the plate 28.

The shaft 32 of the motor is journalled in the plate 46 at 52 and disposed on the opposite side of the plate from the shutter 30 is a cam 54, also shown in FIG. 3. This cam 54 is provided with a detent notch 56 engaged by a detent spring 58, the notch being a recessed generally arcuate notch and the spring 58 having a portion 60 conforming with the notch 58.

A projecting pin 62 on the cam 54 is adapted to engage an end 64 of a latch bar 66 which is pivoted on a pin 68 connected to the plate 46. A plate spring 70 engages the latch bar 66 at 72 and tends to force the latch bar 66 into the solid line position, as shown in FIG. 3 of the drawings.

The latch bar 66 at its end 64 is provided with a catch spring 74 having a hook 76 adapted to be moved into close proximity to the periphery of the cam 54 to prevent rebound of the pin 62 after it strikes the end 64 of the latch bar 66, the prevention of the rebound action of the cam 54 is important to prevent the openings 40 of the shutter plate 30 from passing rearwardly to the area of the lens 26 in an opposite direction, as compared to the arrow 42.

A link 78 is pivotally connected to a normally lower end of the latch bar 66 and this link, at its opposite end, is connected to an armature 80 of a soenoid 82, the armature being urged by a spring 84 into the position shown by solid lines for holding the latch bar 66 in the solid position.

When the solenoid is energized, the armature 80 is retracted thereinto against compression of the spring 84 and moves the latch bar 66 to the broken line position, as shown in FIG. 3.

In operation, the trigger 16 may be pulled when the lens 26 is properly aligned with the target or the subject matter to be photographed. When the trigger is pulled, the switch 18 is closed thereby and the motor 22 and solenoid 24 are concurrently energized and their torque reaction about the axis of the shaft 32 is opposite, and assuming that the inertias of these mechanisms may be balanced, the torque reaction forces cancel out around the axis of the shaft 32 and during rotation of the cam 54 and disc 30 from the solid line position, shown in FIG. 3, to the broken line position of the pin 62, the aperture 40 sweeps past the lens 26 in the direction, as indicated by the arrow 42 and the pin 62 engages the end 64 of the latch bar 66. The pin upon approaching the end of the latch bar 64, deflects the end 76 of the spring 74 and when the pin 62 engages the end of the latch bar, should it tend to rebound, the spring portion 76 prevents it from rotating in a clockwise direction far enough to return the aperture 40 to the area of the lens 26.

When the trigger is released, torque on the motor is stopped, and the spring 84 returns the solenoid armature 80 and link 78 to the solid line position along with the latch bar 66 and thereby moving the detent portion 60 of the spring 58 into engagement with the edge of the notch 56, as indicated by an arrow 88 in FIG. 3 of the drawings. This rotates the cam 54 on around to the solid position and in condition for the next cycle of operation.

It will be appreciated by those skilled in the art, that when the cam moves in a counterclockwise direction, as indicated by the arrow 42 and an arrow 90, that concurrent energization of the solenoid 82 puts the latch bar in the broken line position, as indicated in FIG. 3 of the drawings, and also releases the detent spring 58. Thus, the motor 22 and the solenoid 24 and concurrently energized, and the motor can only rotate a sufficient distance to sweep the aperture 40 past the lens 26 and to the solid line position, shown in FIG. 3, at which position the pin 62 is engaged by the end 64 of the latch bar and the detent spring 76 prevents rebound of the pin. Release of the trigger then permits the detent spring to resume its solid line position and to cam the notch portion 56 of the cam around to the solid position in readiness for the next cycle of operation and the next exposure.

Inasmuch as torque reaction of the motor and the disc 30 are in the opposite direction from that of the solenoid and its connected mechanism, including the latch bar 66, these forces may be balanced out, assuming that the magnitudes of mass are designed in this manner. Accordingly, the shutter, as it makes one pass or sweep relative to the lens 26, smoothly and uniformly exposes the cross-sectional area of the lens to light and permits the light to be transmitted to film on the film holder 92, shown in FIG. 2 of the drawings. Inasmuch as the disc 30 makes one complete revolution and operates without substantial inertia effects on the camera, the exposure is not blurred and the pointing axis of the camera is not deflected due to lens vibration during the exposure of film.

Additionally, any slight torque reaction around the axis of the shaft 32, at great distances at which aerial photography is taken, does not change the angular disposition of the pointing axis of the camera relative to the target or the subject matter being photographed.

Further, those skilled in the art will appreciate the simplicity and the efficiency with which the shutter 30 is moved past the lens 26 from one side to the other in one direction only, as hereinbefore pointed out. This advantageous operation of the lens, together with the low inertia effects of lens operation, and the force balance of the mechanism provides for the minimization of vibration of the camera during the exposure of film carried by the film holder 92.

The term "shutter disc" herein used, may be defined as a shutter plate or rotary plate, while the latch bar 66 may be termed a pivoted member or latch means and the projection 62 may be termed merely a means projecting radially from the axis of the shutter disc or plate 30.

It will be obvious to those skilled in the art that various modifications of the present invention may be resorted to in a manner limited only by a just interpretation of the following claims.

I claim:

1. In a camera, the combination of: a camera housing; a lens carried by said housing; film holding means spaced from said lens in said housing; a rotatable shutter plate rotatably mounted in said housing; said plate having an aperture therethrough, said aperture disposed to be rotated into alignment with and between said lens and film holding means; shutter plate driving means, in said housing, disposed to rotate said plate; first means projecting radially from the axis of said plate and connected thereto; latch means disposed for engaging said first means to interrupt rotation of said plate in a first position, wherein said aperture is out of alignment with said lens and said film holding means; second means for moving said latch means into and out of engagable position relative to said first means; third means for actuating said second means in unison with rotary movement of said plate to cause engagement of said latch means with said first means after said plate is rotated a substantial part of one revolution to carry said aperture in a sweeping path into alignment with and between said lens and film holding means; and detent means for holding said plate in stationary position after it has been stopped by said latch means to thereby ready said plate for successive rotation and movement of said aperture in a swinging movement relative to said lens and said film holder until said aperture reaches said first position, at which said latch means engages said first means and stops rotation of said plate.

2. The invention, as defined in claim 1, wherein: said shutter driving means comprises a motor having a shaft on which said plate is mounted and from which said first means projects in a generally radial direction.

3. The invention, as defined in claim 2, wherein: said latch means comprises a pivoted member pivotally mounted in said housing and having a portion pivotal into interfering relation with said first means; and said second means comprising a solenoid coupled to said pivoted member for actuating it.

4. The invention, as defined in claim 3, wherein: said detent means comprises an engaging member resiliently coupled to said pivoted member; and a cam on said shaft having a cam portion engageable by said engaging member, when said latch means is pivoted out of engagement with said first means.

5. The invention, as defined in claim 4, wherein: a resilient means is disposed to pivot said latch means out of engagement with said first means and to pivot said engaging member into engagement with said cam.

6. The invention, as defined in claim 5, wherein: a rebound resisting latch spring is carried by said pivoted member and adapted and disposed to be deflected and bypassed by said first means as it rotates into engagement with said pivoted member to thereby prevent rebound rotation of said plate to a position, wherein said aperture may return to alignment with said lens; said rebound resisting latch member also located to hold said cam portion within an engaging position of said engaging member of said detent means.

7. The invention, as defined in claim 1, wherein: said aperture diverges toward the periphery of said shutter plate.

References Cited

UNITED STATES PATENTS

| | | | |
|---|---|---|---|
| 3,079,836 | 3/1963 | Schaefer | 95—61 |
| 3,251,286 | 5/1966 | Nawijn | 95—61 |
| 2,270,646 | 9/1966 | Wilson | 95—61 |

NORTON ANSHER, *Primary Examiner.*

L. H. McCORMICK, JR., *Assistant Examiner.*

U.S. Cl. X.R.

95—61